United States Patent

[11] 3,633,935

| [72] | Inventor | Wesley D. Boyer<br>26490 Drummond Court, Franklin, Mich. 48025 |
|---|---|---|
| [21] | Appl. No. | 42,364 |
| [22] | Filed | June 1, 1970 |
| [45] | Patented | Jan. 11, 1972 |

[54] AIR LEVELING SYSTEM FOR AN AUTOMOTIVE VEHICLE
16 Claims, 5 Drawing Figs.

[52] U.S. Cl............................................. 280/124 F,
280/6, 267/65
[51] Int. Cl............................................. B60g 11/26
[50] Field of Search........................................ 280/124 F

[56] References Cited
UNITED STATES PATENTS
| 3,393,921 | 7/1968 | Wilkins ........................ | 280/124 F |
| 3,063,734 | 11/1962 | Davies ......................... | 280/124 F |
| 3,181,853 | 5/1965 | Howell ........................ | 280/124 F |

*Primary Examiner*—Philip Goodman
*Attorneys*—John R. Faulkner and Keith L. Zerschling

ABSTRACT: An air leveling system for an automotive vehicle in which a pneumatic means is interposed between a sprung and an unsprung component of the vehicle for controlling the height of the sprung component with respect to the unsprung component as a function of the pressure of the air in the pneumatic means. An air compressor driven by an electric motor supplies air to the pneumatic means and the electric motor is connected to a source of electrical energy when the height of the sprung component with respect to the unsprung component is below a predetermined minimum. Also, an electrically operated, normally closed bleed valve is connected to the pneumatic means, and this electrically operated, normally closed valve is connected to the source of electrical energy thereby opening it when the height of the sprung component with respect to the unsprung component is above a predetermined maximum.

PATENTED JAN 11 1972

INVENTOR
WESLEY D. BOYER

BY
John R. Faulkner
Keith L. Zerschling
ATTORNEYS

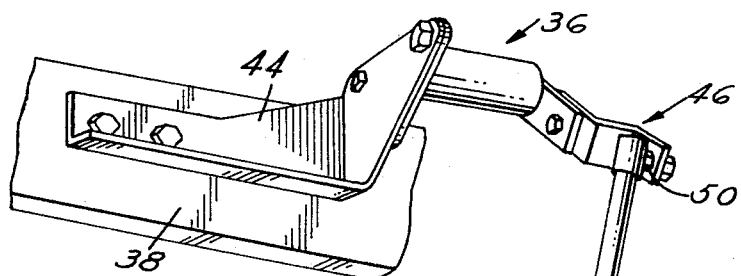
FIG.2
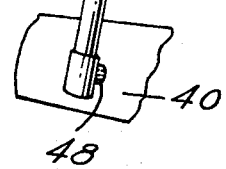
FIG.5
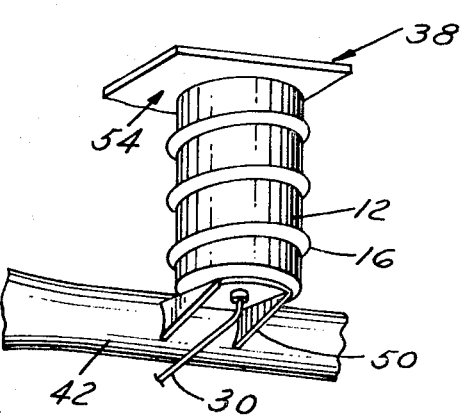
FIG.3
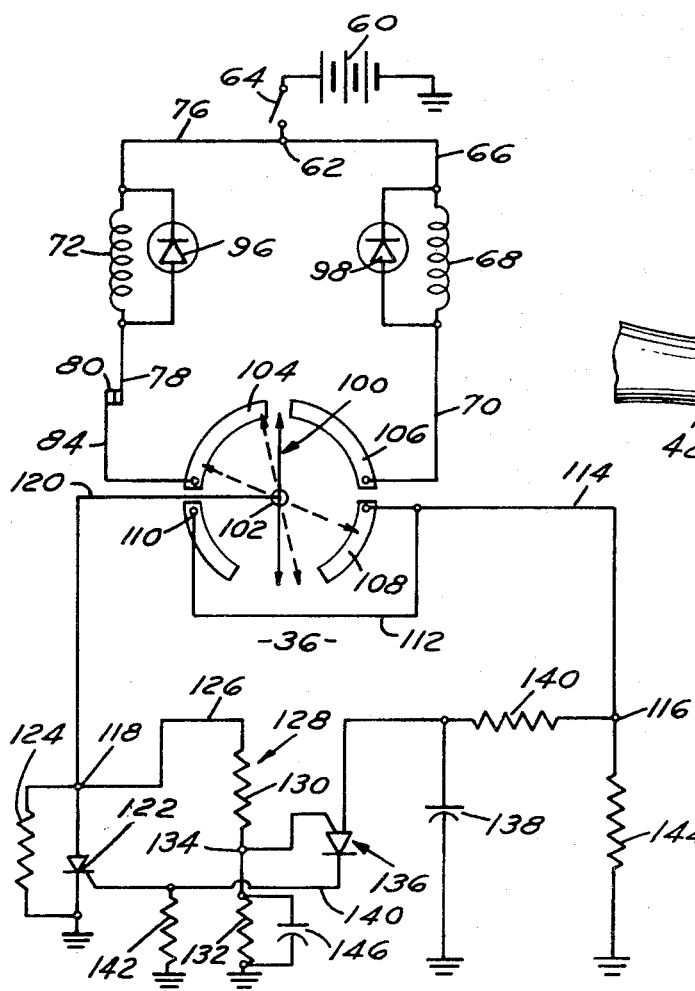
INVENTOR
WESLEY D. BOYER
BY
John R. Faulkner
Keith L. Zerschling
ATTORNEYS

AIR LEVELING SYSTEM FOR AN AUTOMOTIVE VEHICLE

BACKGROUND OF THE INVENTION

This invention relates generally to automatic leveling systems for automotive vehicles and, more particularly, to such automatic leveling systems which will maintain the standing height of a vehicle chassis or body at approximately a constant level thereby compensating for varying load conditions.

It is known in the art to automatically level the height of a vehicle to compensate for varying load conditions. These systems have generally comprised pneumatic means which are operated by pneumatic valving that will automatically supply air or bleed air from an air bag or other pneumatic means as the load in the vehicle is either increased or decreased. Furthermore, it is known in the art to employ electric motors that will apply torsion to a torsion bar suspension system for accomplishing this purpose.

SUMMARY OF THE INVENTION

The present invention includes a pneumatic means interposed between sprung and unsprung components of an automotive vehicle for controlling the height of the sprung component with respect to the unsprung component as a function of the pressure of the air in the pneumatic means: An air compressor driven by an electric motor is provided for supplying air under pressure to the pneumatic means, and an electrically operated, normally closed bleed valve, preferably a solenoid operated valve, is provided for bleeding air from the pneumatic means. Means are provided, preferably in the form of a height sensor switch, which has one member coupled to the sprung component and another member coupled to the unsprung component, for supplying air under pressure from the compressor, i.e., energizing the electric motor that drives the compressor when the height of the sprung component with respect to the unsprung component is below a predetermined minimum. This height sensor switch also energizes the electrically operated, normally closed bleed valve thereby opening it when the height of the sprung component with respect to the unsprung component is above a predetermined maximum.

Either the electric motor or the electrically operated, normally closed valve is energized when either of the above conditions prevail by means of a solid state switching device. This solid state switching device has an output circuit connected in circuit with the source of electrical energy, either the electric motor or the electrically operated, normally closed valve, via the switching means, or height sensor switch, when the height of the sprung component is either below the predetermined minimum or is above the predetermined maximum. This switching means, or height sensor switch, also connects a control or firing circuit, that is connected to the control electrode of the solid state switching device, to the source of electrical energy when either of the above conditions prevail. This control or firing circuit will in turn apply a pulse of electrical energy to the control electrode to switch it to a conducting state. This control or firing circuit may include time delay means which will prevent or delay the application of this pulse of electrical energy to the control electrode until a predetermined time period is elapsed after the height of the sprung component with respect to the unsprung component reaches either the predetermined minimum or the predetermined maximum. Consequently, this time delay means will prevent the operation of the electric motor or the electrically operated valve due to normal road bounce and jounce of the sprung component with respect to the unsprung component.

An object of the present invention is the provision of an automatic leveling system for an automotive vehicle that will maintain the height of a sprung component, or the chassis or body, of a vehicle with respect to an unsprung component, the wheels or axles, at a given desirable height irrespective of the loading of the vehicle.

Another object of the invention is the provision of an automatic leveling system for an automotive vehicle that is primarily electrical in character and uses very reliable solid state components.

A further object of the invention is the provision of a reliable, uncomplicated and inexpensive automatic leveling system for an automotive vehicle that will properly maintain the height of the body or chassis of the vehicle at a desired level irrespective of the loading of the vehicle.

BRIEF DESCRIPTION OF THE DRAWINGS

FIG. 2 is a perspective view showing the installation of the height sensor switch of the present invention;

FIG. 3 is a perspective view showing the installation of a pneumatic means of the present invention;

FIG. 5 is a more detailed circuit diagram of the present invention.

DESCRIPTION OF THE PREFERRED EMBODIMENT

Figure 1:
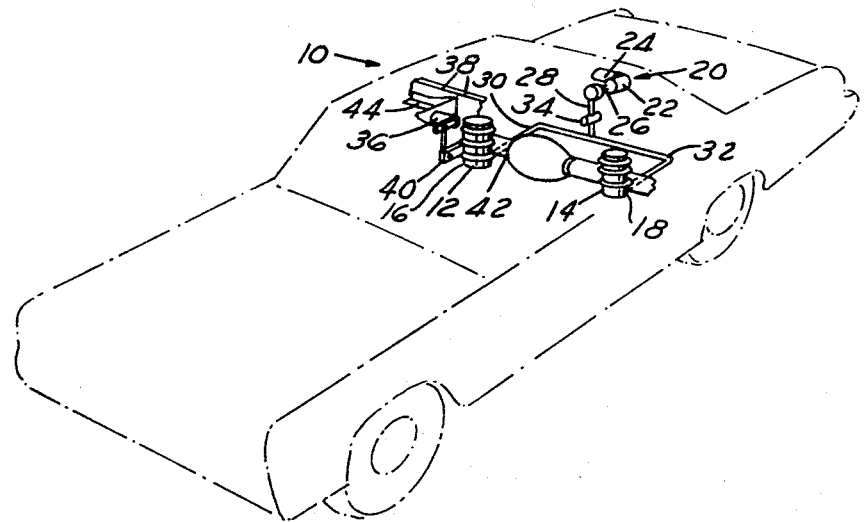
FIG. 1 is a general outline drawing of the air level system of the present invention.

Referring now to the drawings, in which like reference numerals designate like parts throughout the various views thereof, there is shown in FIG. 1 an automotive vehicle 10 that employs the automatic air leveling system of the present invention. As shown here, the automotive vehicle has pneumatic means that may take the form of air bags or cylinders 12 and 14 located within the rear coiled springs 16 and 18 of the vehicle. It is apparent that the pneumatic means may also take various other forms, for example, shock absorbers having air chambers for controlling the height of the vehicle.

An air compressor and motor assembly 20, suitably mounted in the body of the vehicle, is employed to supply air under pressure to the air bags or cylinders 12 and 14. The compressor 22 is driven by an electric motor 24 and the output chamber or line 26 of the compressor 22 is connected through a main line 28 and a pair of branch lines 30 and 32 to the pneumatic means in the form of the air bags or cylinders 12 and 14, respectively. When the electric motor 24 is energized, the compressor will be driven and will supply air to the pneumatic means in the form of the air bags or cylinders 12 and 14. An electrically operated, normally closed valve 34, preferably in the form of a solenoid valve, may be positioned in the line 28 and when this valve is energized, it will open to the atmosphere and thereby vent the pneumatic means in the form of air bags or cylinders 12 and 14 to the atmosphere.

The energization of the electric motor 24 and the electrically operated, normally closed solenoid valve 34 is controlled by a switching means, in the form of height sensor switch 36, that has one member connected or coupled to a sprung component of the vehicle, for example, a portion of the chassis or body 38 and another member connected to a suspension arm 40 which in turn is connected to an unsprung component, for example, axle housing 42. When the height of the sprung component of the vehicle, for example, the body of the vehicle or the frame, is below a predetermined minimum with respect to the unsprung component, for example, the axle housing 42 for the rear wheels of the vehicle due to heavy loading of the vehicle, the height sensor switch 36 will energize the electric motor 24 thereby supplying air under pressure from the compressor 22 to the pneumatic means in the form of the air cylinders or bags 12 and 14. On the other hand, should the height of the sprung component, for example, the body or frame 38 of the vehicle, with respect to the unsprung component, for example, the axle housing 42, exceed a predetermined maximum due to extremely light loading of the vehicle, the height sensor switch 36 will energize the electrically operated, normally closed solenoid valve 34 and thereby vent the pneumatic means in the form of the air cylinders or bags 12 and 14 to the atmosphere.

Referring now to FIG. 2, there is shown the height sensor switch 36 mounted for operation in the automotive vehicle.

This height sensor switch 36 is carried by a bracket 44 that is suitably bolted or affixed to the body or chassis 38 as mentioned in relation to FIG. 1. A linkage system 46 connects another member of the height sensor switch 36, as will be explained subsequently, to an unsprung component of the automotive vehicle, for example, the rear suspension arm 40 as mentioned in relation to FIG. 1. This is done via pivotal connections shown at 48 and 50 so that vertical motion at the suspension arm 40 is converted to rotary motion at the height sensor switch 36.

Referring now to FIG. 3, there is shown the details of the mounting of one of the pneumatic means, for example, the air bag or cylinder 12. It can be seen from this view that the air bag or cylinder 12 is located within and is confined by the right rear helical spring 16. The lower end of the helical spring 16 is supported on a bracket or platform 50 affixed to the rear axle housing 42 and the upper end of the spring 16 is suitably positioned against a bearing member 54 that is affixed to the body or chassis 38 of the vehicle. Thus, the air cylinder or bag 12 is capable of controlling the height of the sprung component, i.e., the body or frame 38 of the vehicle, with respect to the unsprung component, i.e., the axle housing 42, as a function of the air pressure in the air bag or cylinder. As this pressure is increased, the height of the sprung component with respect to the unsprung component will increase and as the air pressure is decreased, the height of the sprung component with respect to the unsprung component will decrease.

Figure 4:
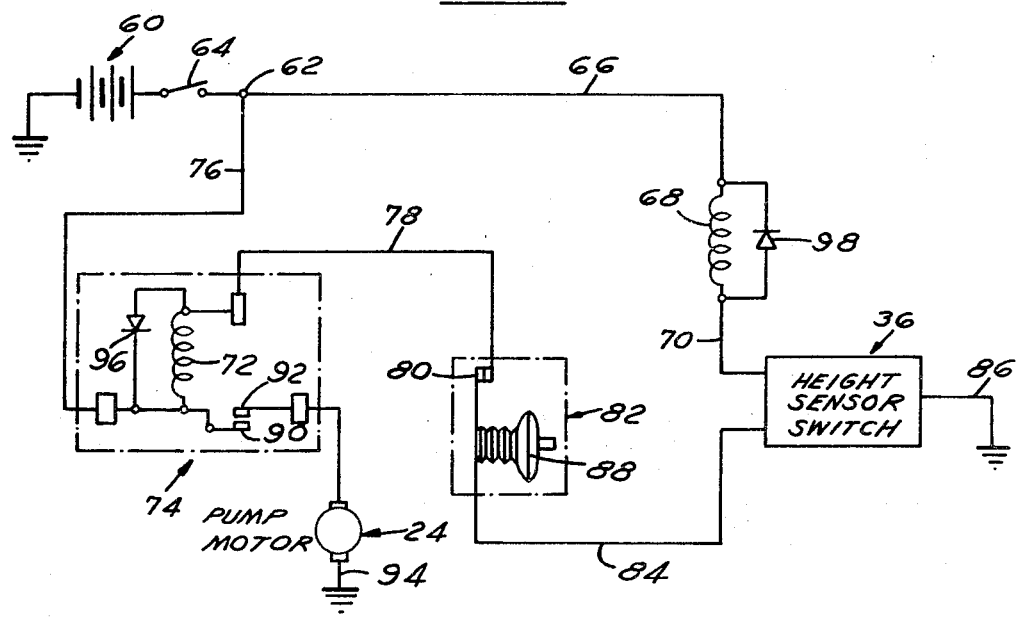
FIG. 4 is a general circuit diagram of the present invention.

Referring now to FIG. 4, there is shown an electrical circuit diagram of the present invention that includes a source of electrical energy in the form of a storage battery 60 having one terminal connected to ground and the other terminal connected to a junction 62 via ignition switch 64. A lead 66 connects one terminal of the solenoid 68 of the electrically operated, normally closed solenoid valve 34 to the junction 62. The other terminal of the solenoid 68 is connected through lead 70 to one terminal of the height sensor switch 36 shown here in block diagram form.

One terminal of winding 72 of a relay 74 is connected to junction 62 through a lead 76. The other terminal of the winding 72 is connected through lead 78 to normally closed contacts 80 of a pressure switch 82. The contacts 80 of the pressure switch are also connected to another terminal of the height sensor switch 36 through a lead 84. A third terminal of the height sensor switch 36 is connected to ground, and hence to one terminal of the source of electrical energy or storage battery 60, through a lead 86. The pressure switch 82 includes a bellows 88 connected into line 26 leading from the compressor 22 (see FIG. 1) so that the contacts 80 will open if excessive pressures exist at the output of the compressor 22.

One of the contacts 90 of the relay 74 is connected to lead 76 and the other contact 92 is connected to one terminal of the electric motor 24. The other terminal of the electric motor 24 is grounded through lead 94 and hence, is connected to the grounded terminal of the source of electrical energy or storage battery 60. Transient suppression diodes 96 and 98 are connected respectively across relay winding 72 and the solenoid 68 of the normally closed, electrically operated solenoid valve 34.

Referring now to FIG. 5, which shows a more detailed circuit diagram of the present invention than FIG. 4, the height sensor switch 36 comprises a rotatable conductive switching arm 100 that is connected to be operated by the linkage mechanism 46 shown in FIG. 2. This arm is rotatable about an axis 102 and conventional bearing means may be provided in the body of the height sensor switch 36 to accomplish this purpose. As can be seen, the conductive switching arm 100 extends in opposed directions from this axis 102. The height sensor switch 36 also comprises a commutator member having a plurality of spaced conductive sectors 104, 106, 108 and 110 whose centers are concentric with the axis 102 about which the switching arm 100 is rotatable. This commutator member is affixed to the chassis or body 38 via the bracket 44 as shown in FIG. 2. The sector 104 is connected through the lead 84 to the pressure switch 80 and hence, the relay winding 72 that controls the operation of the electric motor 24. The sector 106 is connected through the lead 70 to the solenoid 68 of the normally closed, electrically operated solenoid valve 34.

The sectors 108 and 110 are connected through a jumper lead 112 and these two sectors are in turn connected via lead 114 to a junction 116. The rotatable conductive switching arm 100 is electrically connected to a junction 118 via lead 120.

The junction 118 is connected to one output electrode, i.e., the anode, of a solid state switching device 122, preferably in the form of a controlled rectifier. The other output electrode, i.e., the cathode, of the solid state switching device 122 is connected to ground. A resistor 124 is connected in shunt with output electrodes of the solid state switching device 122 between the junction 118 and ground. The junction 118 is also connected through lead 126 to a voltage divider circuit 128 comprising resistors 130 and 132.

A junction 134 positioned between the two resistors 130 and 132 is connected to a gate or control electrode of a programmable unijunction transistor 136 for providing gate or control electrode bias on this control or gate electrode. One output electrode, the anode, of the programmable unijunction transistor 136 is connected to a capacitor 138 and the other output electrode, the cathode, is connected through lead 140 with the control or gate electrode of the solid state switching means 122. The lead 140 is also connected to ground through a resistor 142.

The junction 116 is connected to ground through a resistor 144 and to the capacitor 138 and the anode of the programmable unijunction transistor 136 through a resistor 140. A capacitor 146 is connected across the resistor 132 to provide a transient suppression device for the gate or control electrode of the programmable unijunction transistor 136. The components connected to the junction 116, i.e., the resistors 140 and 144, the capacitor 138 and the programmable unijunction transistor 136 comprise a control or firing circuit means for the solid state switching device 122.

It should be noted, in connection with FIG. 5, that the arcuate spacing between the sectors 104 and 106 is approximately one-fourth the arcuate spacing between the sectors 108 and 110. The switching arm 100, as shown in the solid lines, is in the position where the height of the sprung component of the automotive vehicle, i.e., the body or frame, with respect to the unsprung component, i.e., the axle housing and wheels, is at a proper level. The switch, therefore, is in its null position.

As an example, the space between the sectors 104 and 106 represents a ¼-inch height equivalent between the sprung and unsprung components of the automotive vehicle, while the space between the sectors 108 and 110 represents a 1 inch height equivalent between the sprung and unsprung components of the automotive vehicle.

OPERATION

As stated above, when the height of the sprung component of the automotive vehicle is at a proper level with respect to the unsprung component, the rotatable switching arm 100 will be in the position shown in the solid lines in FIG. 5. As a result, the switching arm is not in contact with any of the conductive sectors 104, 106, 108 or 110, and both the relay winding 72 and the solenoid winding 68 are not energized. Consequently, the compressor 22 will not be driven by the electric motor 24 and the electrically operated, normally closed solenoid valve 34 will be in a closed position thereby sealing the air within the pneumatic means in the form of air bags or cylinders 12 and 14.

If the height of the sprung component, i.e., the body or chassis 38, with respect to the unsprung component, i.e., the rear suspension arm 40 and axle housing 42, decreases, the rotatable switching arm 100 will be rotated counterclockwise as shown in FIG. 5 by the action of the linkage 46. The upper portion of the rotatable switching arm 100 will come into electrical contact with the sector 104 when the arm has moved ⅛- inch height equivalent from the central position shown in the solid lines. It will then take the position shown in the first dotted line position as viewed in FIG. 5 and will connect the conductive sector 104 with the lead 120 thereby sending electrical current from the source of electrical energy 60 through lead 76, relay winding 72, lead 78, closed contacts 80, lead 84, conductive sector 104, switching arm 110, lead 120, junction 118 and resistor 124 to ground. The value of resistor 124 is sufficiently high so that the current through the relay winding 72 is lower than that required to close relay contacts 90 and 92 shown in FIG. 4. This current, however, is sufficient to provide contact cleaning current between the rotatable switching arm 100 and the sector 104. It can be appreciated at this time that the lower end of switching arm 100 is not in contact with conductive segment 108. Consequently, the solid state switching device 122 is in a nonconducting state since the control electrode and the circuitry connected to it is not energized.

The same type of action takes place if the height of the sprung component with respect to the unsprung component increases sufficiently to rotate the rotatable switching arm 100 clockwise into contact with the conductive sector 106. This provides current from the source of electrical energy 60 through lead 66, solenoid winding 68, lead 70, conductive sector 106, switching arm 100, lead 120, junction 118 and resistor 124 to ground. The current through the solenoid 68 is insufficient at this time, with the solid state switching device 122 in a nonconducting state, to operate and open the normally closed, electrically operated solenoid valve 34.

If the height of the unsprung component with respect to the sprung component decreases over one-half inch, then the rotatable switching arm 100 will be rotated by the linkage 46 counterclockwise sufficiently to bring the upper end of the rotatable switching arm 100 into contact with the sector 104 and the lower end thereof into contact with the sector 108. The junction 118 will be energized, as previously described, from the source of electrical energy 60 via conductive sector 104 and rotatable switching arm 100. The junction 116 will be energized from the source of electrical energy 60 through lead 76, relay winding 72, lead 78, contacts 80, lead 84, sector 104, rotatable switching arm 100, sector 108, and the lead 114. At this time, capacitor 138 begins to charge through resistor 140.

If the conductive switching arm 100 remains in contact with both the conductive sectors 104 and 108 for a time greater than a predetermined time delay, determined by the R.C. time constants of the capacitor 138 and the resistor 140 and of the voltage divider 128 comprised of resistors 130 and 132 and capacitor 146, the capacitor 138 will charge to sufficient voltage to cause the programmable unijunction transistor 136 to fire.

The capacitor 138 then discharges through the programmable unijunction transistor 136 thereby providing a positive pulse of electrical energy to the control or gate electrode of the solid state switching device 122 which is developed across the resistor 142. This action causes the solid state switching device 122 to fire or come into a conductive state. This provides a low impedance path for current from the source of electrical energy 60 through the lead 76, relay winding 72, lead 78, contacts 80, lead 84, sector 104, rotatable switching arm 100, lead 120, junction 118, and the output circuit of the solid state switching device 122 to ground. Current flow through the relay winding 72 is sufficient to cause the closure of the relay contacts 90 and 92, shown in FIG. 4, thereby energizing the electric motor 24 directly from the source of electrical energy 60.

The compressor 22 is then driven by the electric motor 24 and this forces air into the pneumatic means, in the form of air cylinders or bags 12 and 14, via conduits 26, 28 and 30 thereby increasing the height of the sprung component of the vehicle with respect to the unsprung component. As this occurs, the rotatable switching arm 100 is rotated through the linkage 46 as the height of the sprung component increases with respect to the unsprung component. The solid state switching device 122 remains in conduction until the height of the sprung component with respect to the unsprung component is at the desired level and the rotatable switching arm 100 (upper end) enters the space between the conductive segments 104 and 106. When this occurs, the solid state switching device 122 is switched to a nonconducting state thereby cutting off current through the relay winding 72, opening contacts 90 and 92 as shown in FIG. 4, and deenergizing the electric motor 24. As a result, the compressor 22 is not longer driven and the pneumatic means in the form of air cylinders or bags 12 and 14 are again sealed.

If on the other hand, the height of the sprung component with respect to the unsprung component increases from its normal level due to unloading of the vehicle, the rotatable switching arm 100 will be rotated clockwise as shown in FIG. 5 via linkage 46. If this height increase exceeds one-half inch, the lower end of the rotatable switching arm 100 will come into contact with the conductive sector 110 which is connected to conductive sector 108 through the lead 122. As a result, the junction 116 will be energized as will the junction 118, as previously explained. If this condition prevails for the given time delay period, as explained above, the capacitor 138 will discharge through the programmable unijunction transistor 136 and will cause a pulse of proper polarity to be applied to the control or gate electrode of the solid state switching device 122 thereby switching it to a conductive state. A low impedance path is thereby provided from the source of electrical energy 60 through the solenoid 68 of the normally closed solenoid valve 34 via lead 70, conductive sector 106, rotatable switching arm 100, lead 120, junction 118 and the output circuit or electrodes of the solid state switching device 122.

This low impedance path provides sufficient current through solenoid 68 to open the normally closed, electrically operated solenoid valve 34 thereby venting the pneumatic means in the form of air cylinders or bags 12 and 14 to the atmosphere. As a result, the height of the sprung component with respect to the unsprung component will decrease, and the rotatable switching arm 100 will be rotated counterclockwise via the linkage 46 shown in FIG. 2. When the height of the sprung component with respect to the unsprung component reaches the proper level, the upper portion of the rotatable switching arm 100 will come into the space between the conductive sectors 104 and 106. As a result, the solid state switching device 122 will cease to conduct thereby cutting off current through the solenoid 68 and closing the normally closed, electrically operated valve 34. This action seals the pneumatic means in the form of air bags or cylinders 12 and 14 thereby stabilizing the height of the sprung component with respect to the unsprung component at the desired or proper level.

If the height of the sprung component with respect to the unsprung component reaches the predetermined minimum level or the predetermined maximum level so that the rotatable switching arm 100 is in contact with the sectors 104 and 108 or is in contact with the sections 106 and 110, respectively, for a time shorter than the above-mentioned time delay period, the capacitor 138 will not charge to a sufficient potential to fire the programmable unijunction transistor 136. As a result, the solid state switching device 222 will not be switched to a conducting state and neither the relay winding 72 nor the solenoid 68 will be energized sufficiently to energize the electric motor 24 or to open the normally closed solenoid valve 34. Consequently, the pressure of the air in the pneumatic means will not change. Under these circumstances, when the rotatable switching arm 100 comes out of contact with either the sector 108 or 110, the capacitor 138 will discharge to ground through resistors 140 and 144, and a new time delay period will commence. This prevents operation of the system and a change in the pressure of the air in the pneumatic means as the height of the sprung component with respect to the unsprung component is changed momentarily and in a transient mode due to various road conditions. A suitable time delay period may be set, for example, at 10 seconds, by proper selection of the values of resistors 140, 130 and 132 and of capacitor 138.

As previously stated, if the upper end of the rotatable switching arm 100 is in contact with the sector 104 and the lower end is in contact with the sector 108, the solid state switching device 122 will be switched to a conducting state thereby energizing relay winding 72 and connecting the electric motor 24 directly to the source of electrical energy 60 through the closed relay contacts 90 and 92. If for any reason, the compressor 22 driven by the electric motor 24 should develop pressures within the system that are above some predetermined maximum level, the bellows 88 of pressure switch 82 as shown in FIG. 4 will expand sufficiently to force the contacts 80 into an open position thereby deenergizing the relay winding 72 which will open contacts 90 and 92 and deenergize the electric motor 24.

The present invention thus provides an uncomplicated, inexpensive and highly reliable automatic air leveling system for an automotive vehicle.

I claim:

1. An air leveling system for an automotive vehicle comprising a sprung component, an unsprung component, a pneumatic means interposed between said sprung and unsprung components for controlling the height of said sprung component with respect to said unsprung component as a function of the pressure of the air in said pneumatic means, a compressor, an electric motor operatively coupled to said compressor to drive said compressor, air delivery means coupled to said air compressor and said pneumatic means, a source of electrical energy, and electrical circuit means for automatically connecting said source of electrical energy to said electric motor when the height of said sprung component with respect to said unsprung component is below a predetermined minimum level.

2. The combination of claim 1 in which said electrical circuit means includes time delay means for delaying the connection between said source of electrical energy and said electric motor for a predetermined time period after the height of said sprung component with respect to said unsprung component reaches and remains below said predetermined minimum level.

3. The combination of claim 1 comprising further and electrically operated normally closed bleed valve coupled to said pneumatic means, said electrical circuit means for automatically including means connecting said source of electrical energy to said electrically operated normally closed bleed valve for opening said valve to atmosphere when the height of said sprung component with respect to said unsprung component is above a predetermined maximum level.

4. The combination of claim 3 in which said electrical circuit means includes time delay means for delaying the connection between said source of electrical energy and said normally closed bleed valve for a predetermined time period after the height of said sprung component with respect to said unsprung component reaches and remains above said predetermined maximum level.

5. The combination of claim 3 in which said electrical circuit means includes time delay means for delaying the connection between said source of electrical energy and said electric motor for a predetermined time period after the height of said sprung component with respect to said unsprung component reaches and remains below said predetermined level and for delaying the connection between said source of electrical energy and said electrically operated normally closed bleed valve for a predetermined time period after the height of said sprung component with respect to said unsprung component reaches and remains above said predetermined maximum.

6. The combination of claim 1 in which said electrical circuit means includes switching means having a pair of relatively movable members, one of said members being operatively coupled to said sprung component and the other of said members being operatively coupled to said unsprung component, and mounting means mounting said two members in position with respect to one another for causing electrical contact between said two members when the height of said sprung component with respect to said unsprung component is below said predetermined minimum, and circuit means coupled to said members for electrically coupling said source of electrical energy to said electric motor when such height is below said predetermined minimum.

7. The combination of claim 6 in which said electrical circuit means comprises further a solid state switching device having an output circuit connected to one of said members of said switching means and in which said source of electrical energy and said electric motor are coupled in circuit with the other of said members, said solid state switching device having a control electrode, a firing circuit means connected to said control electrode and to the other of said members.

8. The combination of claim 7 in which said firing circuit means includes a time delay means for preventing the conduction of said solid state switching device for a predetermined period of time after said one of said members of said switching means makes electrical contact with the other of said members.

9. The combination of claim 3 in which said electrical circuit means includes switching means having a pair of relatively movable members, one of said members being operatively coupled to said sprung component and the other of said members being operatively coupled to said unsprung component, and mounting means mounting said two members in position with respect to one another for causing electrical contact between said two members when the height of said sprung component with respect to said unsprung component is above said predetermined maximum, and circuit means coupled to said members for electrically coupling said source of electrical energy to said electrically operated normally closed bleed valve when such height is above such predetermined maximum.

10. The combination of claim 9 in which said electrical circuit means comprises further a solid state switching device having an output circuit connected to one of said members of said switching means and in which said source of electrical energy and said electrically operated normally closed bleed valve are coupled in circuit with the other of said members, said solid state switching device having a control electrode, a firing circuit means connected to said control electrode and to the other of said members.

11. The combination of claim 10 in which said firing circuit means includes a time delay means for preventing the conduction of said solid state switching device for a predetermined period of time after one of said members of said switching means makes electrical contact with the other of said members.

12. An automatic air leveling system for an automotive vehicle comprising a sprung component, an unsprung component, pneumatic means interposed between said sprung and unsprung components for controlling the height of said sprung component with respect to said unsprung component as a function of the pressure of the air in said pneumatic means, first electrically operated means coupled to said pneumatic means for supplying air under pressure to said pneumatic means, second electrically operated means coupled to said pneumatic means for venting said pneumatic means to atmosphere, a source of electrical energy, a solid state switching device having a pair of output electrodes and a control electrode, a switching means having a pair of relatively movable members, one of said members coupled to said sprung component and the other of said members coupled to said unsprung component, circuit means including said switching means for connecting said source of electrical energy to said first electrically operated means and said output electrodes of said solid state switching device when the height of said sprung component with respect to said unsprung component is below a predetermined minimum level and for connecting said source of electrical energy to said second electrically operated means and the output electrodes of said solid state switching device when the height of said sprung component with respect to said unsprung component is above a predetermined maximum level, and circuit means including said switching means coupled to said control electrode of said solid state switching device for applying a pulse of electrical energy of proper polarity to said control electrode to cause conduction of said solid state switching device when the height of said sprung component with respect to said unsprung component is either below said predetermined minimum level or above said predetermined maximum level.

13. The combination of claim 12 in which said last mentioned circuit means further comprises time delay means for delaying the application of said pulse of electrical energy to said control electrode for a predetermined time period after the height of said sprung component with respect to said unsprung component reaches and remains below said predetermined minimum level or reaches and remains above said predetermined maximum level.

14. The combination of claim 13 in which said switching means comprises a rotatable switching arm coupled to one of said components and a commutator having a plurality of spaced conductive sectors coupled to the other of said components, said rotatable switching arm connected electrically to the output electrodes of solid state switching device, one of said conductive sectors coupled electrically to said source of electrical energy and said first electrically operated means, and a second of said conductive sectors adjacent said first mentioned conductive sector electrically coupled to said source of electrical energy and said second electrically operated means.

15. The combination of claim 14 in which said rotatable switching arm is rotatably mounted about an axis located at the center of said sectors.

16. The combination of claim 15 in which said rotatable switching arm extends in opposed directions from said axis, a third conductive segment positioned diametrically opposite said first conductive sector and a fourth conductive sector positioned diametrically opposite said second conductive sector, said third and fourth sectors electrically connected to said circuit means for applying a pulse of electrical energy to said control electrode of said solid state switching device, said rotatable arm contacting said first and third sectors when the height of said sprung component with respect to said unsprung component is below said predetermined minimum level and contacting said second and fourth sectors when the height of said sprung component with respect to said unsprung component is above said predetermined maximum level.

* * * * *